United States Patent
Lenfant

[15] 3,677,279
[45] July 18, 1972

[54] AUTOMATIC GAS-TRAP
[72] Inventor: Henri Lenfant, Heppenbach, Belgium
[22] Filed: Sept. 24, 1970
[21] Appl. No.: 74,952

[30] Foreign Application Priority Data
Sept. 26, 1969 Belgium..............................739,453

[52] U.S. Cl..............................137/197, 137/209, 137/408
[51] Int. Cl. .................................................F16r 45/02
[58] Field of Search ...........................137/408, 189, 197, 209

[56] References Cited
UNITED STATES PATENTS
2,546,434  3/1951  Farnsworth............................137/189
708,996  9/1902  Campbell...............................137/189

*Primary Examiner*—Alan Cohan
*Attorney*—Silverman & Cass

[57] ABSTRACT

An automatic gas-trap for discharging undesirable gas accumulation in a liquid chamber. The chamber is mounted for movement between a first, gas relief position, and a second, closed position. Two valves are arranged on a rigid duct attached to the chamber, both valves being designed to open when the chamber moves to the first position to enable expulsion of the gas therefrom. When gas pressure is reduced inside the chamber, the chamber moves back to its second position which corresponds to the closing of the two valves.

2 Claims, 2 Drawing Figures

INVENTOR:
HENRI LENFANT

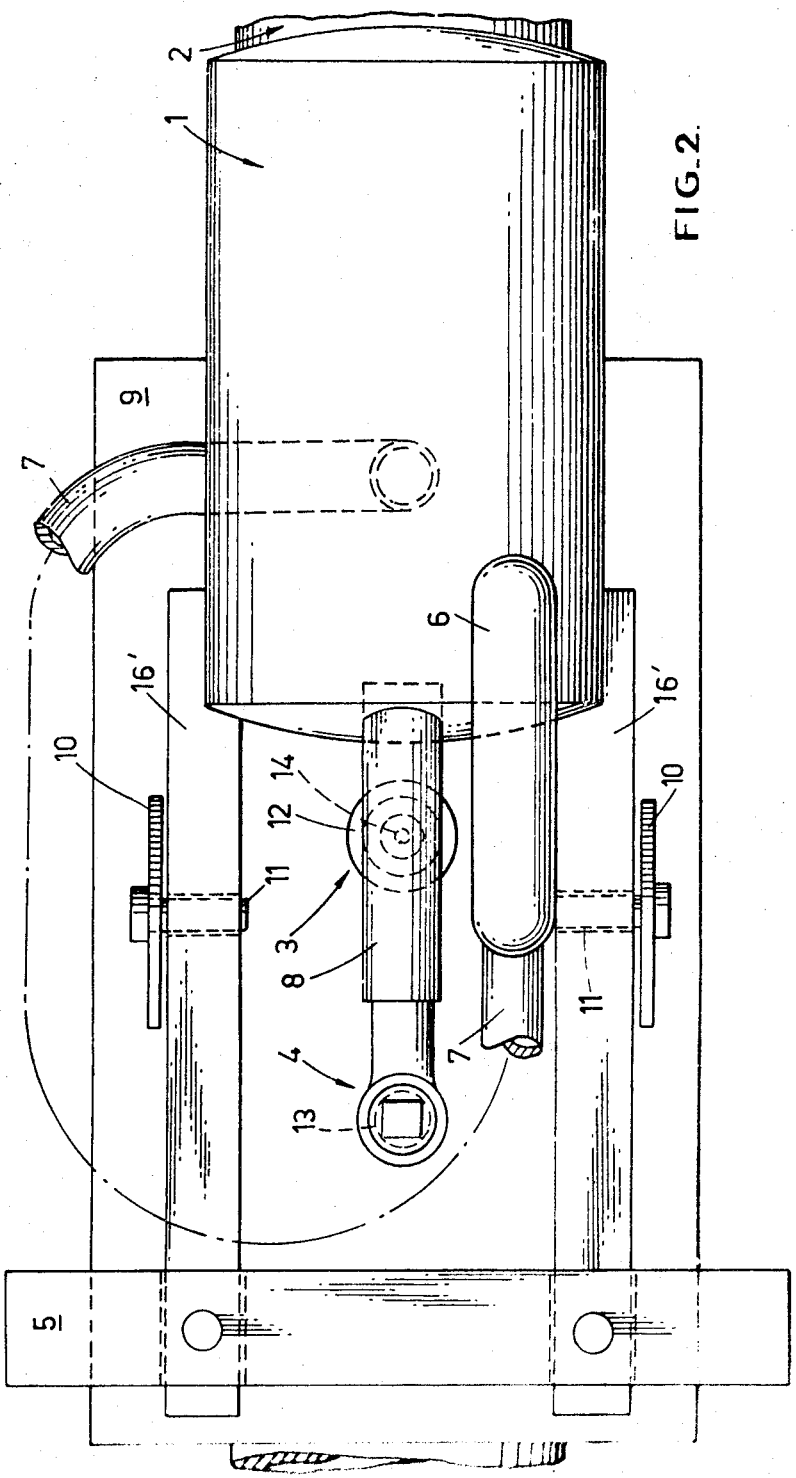

AUTOMATIC GAS-TRAP

This invention pertains to an automatic gas-trap for liquid containers or pipes, which is designed to discharge a gas such as air, which accumulates at the uppermost points of said pipes or containers and which impedes the flow of the liquid, said trap comprising a chamber communicating with a pipe and means for allowing from a determined gas pressure level in the chamber and consequently a determined liquid level in said chamber, the gas to escape while preventing the liquid from being discharged.

The known gas-traps have various drawbacks and notably, on the one hand, the drawback of being controlled by a float and, on the other hand, of having an abnormal operation when the gas pressure inside the trap chamber is too high. Indeed the use of a float causes many difficulties because it is substantially impossible to provide for a trap a tight float and to get such a float which remains tight. The floats have to be regularly checked and frequently replaced if the gas-traps provided therewith are to remain effective. In most existing traps, it may also happen that the means allowing the gas to escape are blocked in spite of the float weight, by the pressurized gas which is retained inside the chamber.

The invention has for object to obviate said drawbacks and to provide a gas-trap which operates without a float and which allows the gas to escape from the trap chamber whatever pressure level is present inside said chamber, the gas-trap according to the invention also having the advantage that it may easily be adapted to the various gas pressure conditions prevailing in the pipes.

For this purpose, according to the invention, said chamber is movable relative to the pipe so as to be able to occupy two end positions, one position in which said means allow the gas to escape and the other position, reached when some liquid has entered the chamber to bring said chamber from the first to the second position, in which said means prevent the discharge of the gas and the liquid.

In another embodiment of the invention, said chamber is rotatably mounted on the pipe so as to be movable against the action of a counterweight, about a substantially horizontal axis.

According to an advantageous embodiment, the chamber communicates with the pipe through two ducts which are at least partly flexible, one of the ducts opening in the upper part of the chamber and the second duct opening in the lower part thereof.

In a particularly advantageous embodiment, said means are comprised of two valves arranged on a rigid duct which is attached to the chamber and which communicates therewith to allow the gas to escape, both said valves being so designed as to open when the chamber moves and is displaced from said second position to said first position, by means of members which are fixed relative to the pipe, the one valve being fixed relative to the pipe and cooperating with an opening in said duct, the other valve being operated by a spring and opened against the action thereof, when said other valve cooperates with one of said members by the displacement of the chamber, the first valve causing an expansion in said chamber when the pressurized gas has driven out the liquid contained in the chamber and when said chamber has moved under the counterweight action, so as to prevent said second valve remaining closed even when it cooperates with said fixed member, due to too high a pressure inside the chamber.

Other detail and features of the invention will stand out from the description given below by way of nonlimitative example and with reference to the accompanying drawings, in which;

FIG. 2 is a plan view with parts broken away, corresponding to FIG. 1.

In the various figures, the same references pertain to similar elements.

Figure 1:
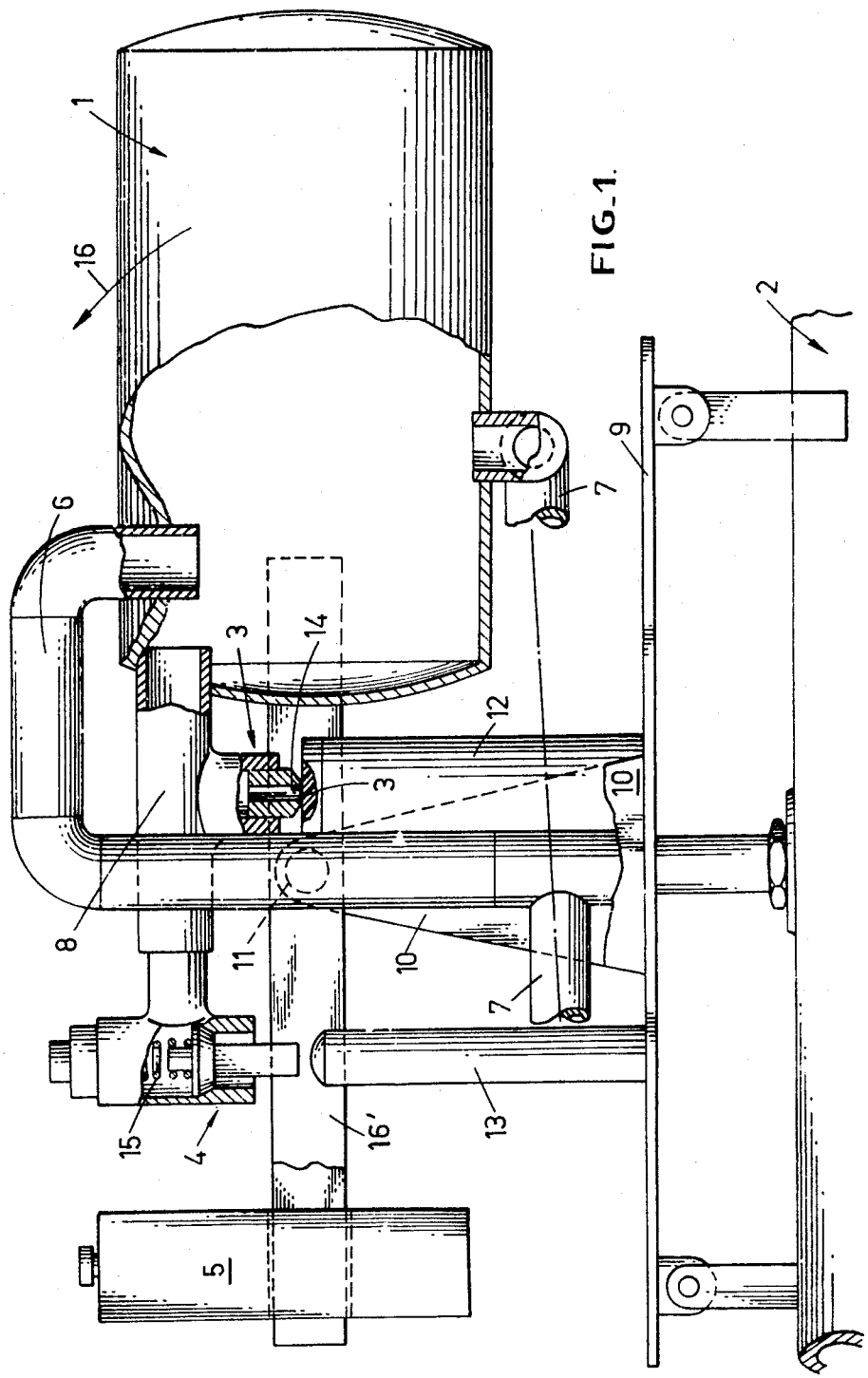
FIG. 1 is an elevation view with parts broken away, of an automatic gas-trap according to the invention, said trap being shown in the position where both valves are closed.

The automatic gas-trap according to the invention comprises a chamber 1 which communicates with a liquid pipe 2 and which is movable relative thereto, so as to be able to lie in two end positions, one position in which valves 3 and 4 are open and allow the gas to escape, and another position which is reached when liquid has entered the chamber 1 to bring said chamber against the action of a counterweight 5, from the first to the second position, in which the valves 3 and 4 are closed and prevent the discharge of the gas and the liquid. Chamber 1 communicates with the pipe 2 through two ducts 6 and 7, which are at least partly flexible, said ducts opening in the upper part and in the lower part of the chamber 1 so as to let the liquid enter said chamber 1 through the ducts 6 and 7, and to allow said liquid to be driven out of said chamber through the duct 7, under the action of the gas entering said chamber 1 through the duct 6. The valves 3 and 4 are arranged on a rigid duct 8 which is attached to chamber 1 and which communicates with the upper part thereof. The elements comprising the gas-trap are mounted on a plate 9 which is attached to the pipe 2 and which is provided with two cheeks 10 which bear an horizontal shaft 11 about the axis of which swing the chamber 2, the counterweight 5 and the movable parts of valves 3 and 4, the fixed parts thereof being mounted on said plate 9. Said valves 3 and 4 are so designed as to open when the chamber moves and is displaced from the second to the first position thereof, by means of members 12 and 13 which are attached to plate 9. The valve 3 is fixed relative to pipe 2 and said valve cooperates with an opening 14 in duct 8, while the valve 4 is operated by a spring 15 and it is opened against the action thereof, when said valve cooperates with member 13 when said chamber 1 is displaced. Said valve 3 when it is opened, always causes an expansion inside chamber 1 when the pressurized gas has driven out the liquid contained in the chamber and when said chamber rotates under the action of the counterweight so as to prevent valve 4 remaining closed even when it cooperates with member 13, due to too high a pressure inside chamber 1.

The gas-trap according to the invention operates as follows: when some liquid is present inside chamber 1, said chamber lies in the position as shown in the drawings and the liquid weight maintains the valves 3 and 4 closed against the action of counterweight 5. When gas enters the chamber 1 through duct 6 and the pressure thereof is high enough to drive the liquid out through duct 7, the chamber weight is reduced and said chamber swings along the direction shown by arrow 16, under the action of counterweight 5 and the valves 3 and 4 open to let the gas out. When the gas pressure is reduced inside chamber 1, some liquid enters said chamber again and brings said chamber back to the position thereof which corresponds to the closing of valves 3 and 4.

Besides the advantage of working without a float, the gas-trap according to the invention has the advantage that the closing pressure for valve 3 increases or decreases according to the liquid pressure prevailing inside the pipe 2. Indeed when the pressure inside the pipe increases, the gas volume inside the chamber 1 is reduced and the liquid volume is increased, which increases the chamber weight and consequently the closing pressure for valve 3. Moreover, the swinging arrangement of the chamber 1 about the shaft 11 allows to vary the closing pressure for valve 3 by lengthening or shortening the lever arm, by adjusting the position relative to said chamber 1, of the axis about which said chamber rotates. It is also possible to provide for the adjustment of the position of counterweight 5 relative to the chamber 1, by so arranging said counterweight that it may slide and be locked on arms 16' which are attached to the walls of said chamber 1.

The gas-trap according to the invention does not require substantially any maintenance, as the very slight movements of the movable parts thereof do not cause any perceptible wear.

As it is the case with the other gas-traps, the trap according to the invention has also for object to annihilate hammerings, but the gas-trap according to the invention has also the advantage as explained above, that it may be adjusted accurately so as to operate unfailingly when the pressure level inside the pipe reaches a value which endangers said pipe.

According to the invention, said valves 3 and 4 may also be arranged on either side of the shaft 11 about the axis of which swings the chamber 1, the valve 3 being fixed relative to the pipe 2 and cooperating with the opening 14 in the duct 8, while the valve 4 is arranged on the upper part of chamber 1, in such a way that the opening thereof be controlled by said spring when said valve cooperates with a member similar to member 13 which is fixed relative to pipe 2 when said chamber 1 is displaced as the gas drives the liquid out therefrom, said valves always being so arranged that valve 3 when it opens, causes an expansion inside chamber 1 so as to prevent valve 4 remaining closed even when said valve cooperates with said fixed member, due to too high a pressure inside said chamber.

It must be understood that the invention is in no way limited to the above embodiments and that many changes may be brought therein without departing from the scope of the invention as defined by the appended claims.

It would notably be possible to dispense with said arms 16′ attached to the chamber 1, said chamber then being rotatably mounted on a pillar which replaces the cheeks 10, through the rigid duct 8 on which may be located the counterweight 5. The gas-trap may be made more sensitive by substituting to the shaft 11, a knife-edge arrangement similar to the system used in scales, which cooperates with said pillar.

What I claim is:

1. Automatic gas-trap for liquid containers or pipes which is designed to discharge a gas accumulating at the uppermost points of said containers or pipes, said gas-trap comprising, a movable chamber having an upper and a lower part, said chamber communicating with a pipe through two ducts opening in the lower part and in the upper part respectively of the chamber and arranged such that the chamber may be filled at least partially with liquid or gas originating from the pipe, two valves, one main valve fitted to control the escape of the gas from the chamber and a subsidiary valve fitted to assist the opening of the main valve when the pressure of the gas inside the chamber is too high to permit the main valve to open, said two valves being mounted on a rigid duct secured to the chamber and communicating therewith, a counterweighted lever secured to the chamber and hinged such that the two valves are closed when the chamber contains a predetermined volume of liquid, the subsidiary valve including a seat stationary with reference to the pipe and cooperating with a port in the rigid duct secured to the chamber, the main valve including a movable member cooperating with a spring for biasing said movable member onto a valve seat, the movable member and the seat being mounted on the duct secured to the chamber, and a second member stationary with reference to the duct, the second member being fitted to move the movable member against the action of the spring and to open the main valve when the liquid is driven out of the movable chamber by the action of the gas accumulating inside the chamber, said counterweighted lever being operable to open the subsidiary valve before the main valve in order to reduce the pressure of the gas in the rigid duct when the gas drives the liquid out from the chamber into the duct.

2. Gas-trap as claimed in claim 1 comprising a plate secured to the lower duct, said plate being provided with two cheeks, said cheeks supporting a horizontal shaft, the movable chamber being rotatable about the axis of said shaft, the counterweighted lever and the movable parts of the two valves being provided on the rigid duct secured to the chamber, the stationary portions of the valves being mounted on said plate.

* * * * *